(12) United States Patent
Marmon et al.

(10) Patent No.: US 9,663,039 B2
(45) Date of Patent: May 30, 2017

(54) FOLDING HITCH

(71) Applicant: Discount Ramps.com, LLC, West Bend, WI (US)

(72) Inventors: Lawrence Marmon, Milwaukee, WI (US); Robert Krolski, West Bend, WI (US)

(73) Assignee: Discount Ramps.com, LLC, West Bend, WI (US)

( * ) Notice: Subject to any disclaimer, the term of this patent is extended or adjusted under 35 U.S.C. 154(b) by 0 days.

(21) Appl. No.: 14/993,758

(22) Filed: Jan. 12, 2016

(65) Prior Publication Data

US 2016/0200157 A1 Jul. 14, 2016

Related U.S. Application Data

(60) Provisional application No. 62/102,676, filed on Jan. 13, 2015.

(51) Int. Cl.
*B60D 1/58* (2006.01)
*B60R 9/06* (2006.01)

(52) U.S. Cl.
CPC . *B60R 9/06* (2013.01); *B60D 1/58* (2013.01)

(58) Field of Classification Search
CPC .................................. B60R 9/06; B60D 1/58
USPC ..................... 280/494, 489, 491.1
See application file for complete search history.

(56) References Cited

U.S. PATENT DOCUMENTS

| 4,413,761 A | 11/1983 | Angel |
| 5,190,195 A | 3/1993 | Fullhart et al. |
| 5,280,941 A * | 1/1994 | Guhlin ............. B60D 1/60 280/507 |
| 5,303,857 A | 4/1994 | Hewson |
| 5,330,084 A * | 7/1994 | Peters ............. B60R 9/06 211/171 |
| 5,529,231 A | 6/1996 | Burgess |

(Continued)

FOREIGN PATENT DOCUMENTS

EP 1059205 7/2003

OTHER PUBLICATIONS

19×60 Curt Cargo Carrier for 2" Hitches by Curt, http://www.etrailer.com/Hitch-Cargo-Carrier/Curt/C18109.html, website visited Sep. 12, 2014.

(Continued)

*Primary Examiner* — Anne Marie Boehler
*Assistant Examiner* — Marlon A Arce
(74) *Attorney, Agent, or Firm* — Andrus Intellectual Property Law, LLP (57) ABSTRACT

A folding hitch assembly, system, and method includes two opposed sides plates and a vehicle shank secured partially between the two opposed sides plates and extends outward therefrom. A support ledge is secured between the two opposed side plates and a support bar is secured between the two opposed side plates in a position intermediate the pivot holes and the vehicle shank. An accessory shank is pivotable about a pivot point between a first position at least partially defined by engagement of the accessory shank with the support ledge and a second position at least partially defined by engagement of the accessory shank with the support ledge and a support bar, a first pair of retention holes are configured to receive a retention rod to lock the accessory shank in one of the first and second position.

18 Claims, 8 Drawing Sheets

(56) References Cited

U.S. PATENT DOCUMENTS

| | | | | |
|---|---|---|---|---|
| 5,664,717 | A * | 9/1997 | Joder | B60R 9/10 224/502 |
| 5,775,560 | A | 7/1998 | Zahn et al. | |
| 6,062,451 | A * | 5/2000 | Lassanske | B60R 9/10 224/502 |
| 6,129,371 | A | 10/2000 | Powell | |
| 6,390,343 | B1 | 5/2002 | Jain | |
| 6,494,478 | B1 * | 12/2002 | MacKarvich | B60D 1/06 177/136 |
| 6,511,088 | B2 | 1/2003 | Kahlstorf | |
| 6,877,758 | B2 * | 4/2005 | Colistro | B60D 1/075 180/14.4 |
| 6,929,163 | B1 * | 8/2005 | Pedrini | B60R 9/06 224/506 |
| 7,229,130 | B1 | 6/2007 | Holly et al. | |
| 7,261,228 | B2 | 8/2007 | Prescott et al. | |
| 7,731,219 | B2 | 6/2010 | Okerlund et al. | |
| 7,997,605 | B2 * | 8/2011 | Kittrell | B60D 1/06 280/400 |
| 8,251,265 | B2 | 8/2012 | Grudek | |
| 8,480,149 | B2 | 7/2013 | Durand | |
| 8,602,279 | B2 | 12/2013 | Sautter et al. | |
| 9,505,281 | B1 * | 11/2016 | Borkholder | B60D 1/248 |

OTHER PUBLICATIONS

23×59 DeeZee Cargo Carrier for 2" Hitches by DeeZee, http://www.etrailer.com/Hitch-Cargo-Carrier/DeeZee/DZ760083.html, website visited Sep. 12, 2014.

20×60 Detail K2 Cargo Carrier for 2" Hitches by K2, http://www.etrailer.com/Hitch-Cargo-Carrier/Detail-K2/K2HCC602.html, website visited Sep. 12, 2014.

Folding Cargo Carrier for 2" Sq. Receivers, 20"×48" Platform, Pro Series by Cequent Performance Products, http://www.proseriestowing.com/products/cargo-management/cargo-carriers/cargo-carrier-folding/uHvTF2JB0IP%7CnA%7CdotskME573Ju8CPOo, website visited Sep. 12, 2014.

Hitch Basket Accessories by Surco Inc., http://www.surcoinc.com/H-HBacc.html, website visited Sep. 12, 2014.

Folding 2" Trailer Hitch Mount Shank Adaptor Cargo Wheelchair Carrier by T-Motorsports, http://www.ebay.com/itm/Folding-2-Trailer-Hitch-Mount-Shank-Adapter-Cargo-Wheelchair-Carrier-Fold-Up-/150729826786?, website visited Sep. 12, 2014.

Folding Cargo Carrier by Tweety's.com, http://tweetys.com/folding-cargo-carrier.aspx?gclid=CPeWiqvu28ACFc1_Mgoda2kASA, website visited Sep. 12, 2014.

* cited by examiner

FOLDING HITCH

CROSS-REFERENCE TO RELATED APPLICATION

The present application claims priority of U.S. Provisional Patent Application No. 62/102,676, filed on Jan. 13, 2015, the content of which is hereby incorporated herein by reference in its entirety.

BACKGROUND

Cargo racks, baskets, and other accessories are popular solutions for vehicle owners to add additional cargo carrying capacity to a car, truck, or SUV.

Many of these accessories secure to the vehicle with a receiver hitch and extend rearwardly from the back of the vehicle. The extension of these accessories rearwardly from the vehicle increases the vehicle's overall length. Particularly when the accessory is not in use, this increased length is inconvenient or undesirable when maneuvering, parking, or storing the vehicle. Solutions exist to either remove or move the accessory out of the way when not in use however, more convenient and stable solutions are desirable in the field.

With any hitch-mounted vehicle accessory, wobble is a concern. Dimensioning differences between a coupling shaft and a hitch receiver produce slight movements between the two components at the point of engagement. Since the hitch mounted accessory necessarily extends away from this point of engagement, these slight movements are magnified to a significant and noticeable wobble at the far end of the accessory. When the accessory is loaded with cargo (e.g. boxes, luggage, a motor cycle, an ATV, a bicycle, etc.), the extra mass can create a significant force moment not only on the hitch itself and the accessory shank, but also on the cargo. This can result in damage of any of these items. The problem of wobble is further compounded as more of such joints are added between the receiver hitch and the far end of the vehicle accessory, for example when a hitch adaptor is positioned between a hitch receiver and vehicle accessory. Anti-wobble (e.g. anti-tilt or hitch stabilization) devices are currently offered as after market products, but are limited in that they are only effective at stabilizing two components intended to be kept rigid to one another and are therefore not effective for use with folding or moveable mounts.

BRIEF DISCLOSURE

An exemplary embodiment of a folding hitch assembly includes two opposed side plates. A vehicle shank is secured partially between the two opposed side plates and extends outward therefrom. A support ledge is secured between the two opposed side plates. Pivot holes are respectively located in each of the opposed side plates. The pivot holes are located through the side plates intermediate to the support ledge and the vehicle shank. A support bar is secured between the two opposed side plates at a position intermediate the pivot holes and the vehicle shank. A pair of first retention holes extend through the opposed side plates and are located below the pivot holes and towards the shank from the pivot holes.

An exemplary embodiment of a folding hitch system includes an accessory shank with the first side and an opposed second side. A hitch body includes two opposed side plates. The accessory shank is pivotably secured between the two opposed side plates at a pivot point. The hitch body includes a support ledge which is secured between the two opposed side plates at a position forward the pivot point. A support bar is secured between the two opposed side plates at a position rearward of the pivot point. A pair of first retention holes through the opposed side plates are located below the pivot point and rearward of the support ledge. A pair of second retention holes extend through the opposed side plates and are located below the pivot point and rearward the pivot point. A vehicle shank is secured partially between the two opposed side plates and extends rearward therefrom. A retention rod is selectively securable between the pair of first retention holes and the pair of second retention holes. The accessory shank is pivotable between a first position and a second position. When the accessory shank is in the first position the retention rod is secured between the first retention holes and engages the second side of the accessory shank to secure the accessory shank in the first position. When the accessory shank is in the second position, the retention rod is secured between the second retention hole and engages the first side of the accessory shank to secure the accessory shank in the second position.

An exemplary embodiment of a method of securing an accessory to a vehicle includes pivotably securing an accessory shank of a vehicle accessory to the folding hitch adaptor at a pivot point. The folding hitch adaptor includes two opposed side plates. The folding hitch adaptor 30 includes a vehicle shank, a support ledge, and a support bar. The vehicle shank is secured partially between the two opposed side plates and extends outward therefrom. The support ledge is secured between the two opposed side plates. A support bar is secured between the two opposed side plates at a position intermediate the pivot point and the vehicle shank. A pair of first retention holes through the opposed side plates are located below the pivot holes and towards the vehicle shank from the pivot holes. A pair of second retention holes through the opposed side plates are located below the pivot point and rearward of the support ledge. A pair of second retention holes through the opposed side plates are located below the pivot point and towards the vehicle shank from the pivot point. The vehicle shank is secured to a hitch receiver of a vehicle. The accessory shank is pivoted about the pivot point to a first position. A first side of the accessory shank engages the support ledge. The accessory shank is locked in the first position by securing a retention rod through the pair of first retention holes in engagement with a second side of the accessory shank. The retention rod is removed from the pair of first retention holes. The accessory shank is pivoted about the pivot point to a second position. The first side of the accessory shank engages the support ledge. The second side of the accessory shank engages the support bar. The accessory shank is locked in the second position by securing the retention rod through the pair of second retention holes engagement with the first side of the accessory shank.

DETAILED DISCLOSURE

Figure 1:
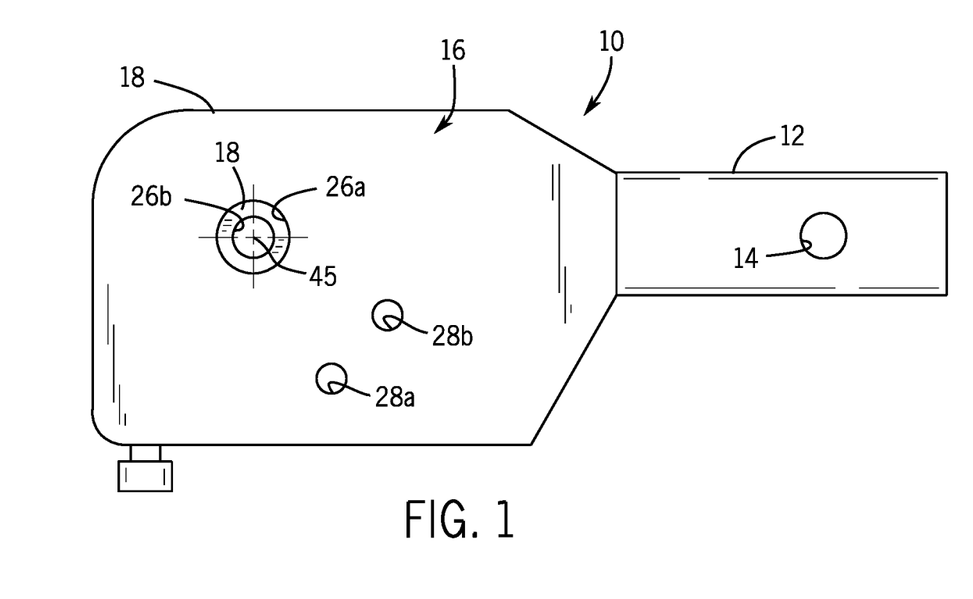
FIG. 1 is a side view of an exemplary embodiment of a folding hitch.

FIG. 1 is a side view of an exemplary embodiment of a folding hitch 10. The folding hitch 10 includes a hitch shank 12 that is configured to be received by a receiver, exemplarily secured to a vehicle. In an exemplary embodiment, the shank 12 is dimensioned to securely fit within the receiver, which may be configured in any of a variety of standard or non-standard dimensions, including, but not limited to, 2 inches and 1.5 inches in diameter or cross section. Receivers and mating shanks are typically square in cross-section. A pin hole 14 is located in the hitch shank 12 so that a retaining pin (not depicted) can be fed through the receiver (not depicted) and the pin hole 14 in the hitch shank 12 to secure the folding hitch 10 to the vehicle.

The folding hitch 10 may further include a body 16 secured to the hitch shank 12, exemplarily by welding, although it will be recognized that the body 16 may be secured in other ways including, but not limited to, integral construction, in embodiments of the folding hitch 10.

Figure 2:
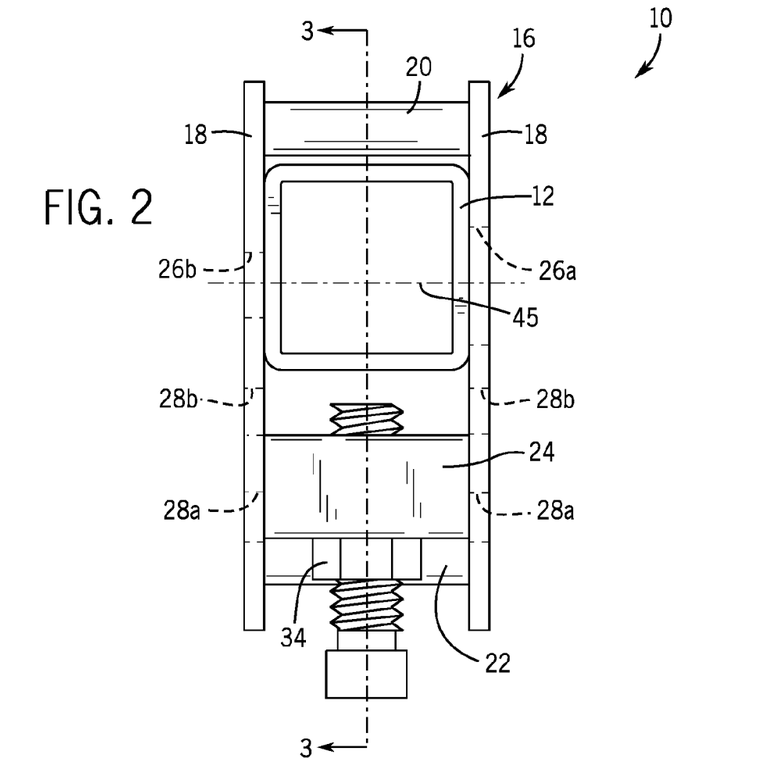
FIG. 2 is a front view of an exemplary embodiment of a folding hitch.

Referring to FIG. 2, which is a front view of an exemplary embodiment of the folding hitch 10, the body 16 may be exemplarily constructed of two generally opposed side plates 18. The side plates 18 may be generally parallel to one another. In an exemplary embodiment, at least one support bar 20 extends between the side plates and at least partially defines the distance between the side plates 18. The side plates 18 may further be secured to opposing sides of the hitch shank 12, also defining the distance between the side plates 18. In the embodiment depicted, the folding hitch 10 further includes a second support bar 22 and a support ledge 24, which both also extend between interior sides of the side plates 18. The support ledge 24 will be described in further detail herein. Similar to what is described above with respect to the connection between the body 16 and the hitch shank 12, the side plates 18 may further be exemplarily welded to the respective support bars 20, 22 and support ledge 24. In other embodiments, these components may be bolted, screwed or may be separate pieces secured in other manners as well.

Referring back to FIG. 1, the body 16 further includes pivot holes 26a, 26b through each of the side plates 18. In the embodiment depicted, the pivot holes 26a, 26b through the side plates 18 are two different sizes, while in another embodiment, the pivot holes 26a, 26b may be the same or similar in size. As seen in FIGS. 1 and 2, the pivot hole 26a is larger in diameter than pivot hole 26b. As will be described in further detail herein, a shank of an accessory (not depicted) is pivotally secured to the folding hitch, exemplarily by a pivot rod (not depicted) which may exemplarily be a pivot bolt (not depicted) through the pivot holes 26a, 26b. This defines a pivot point 45 about which the accessory shank pivots.

Figure 5:
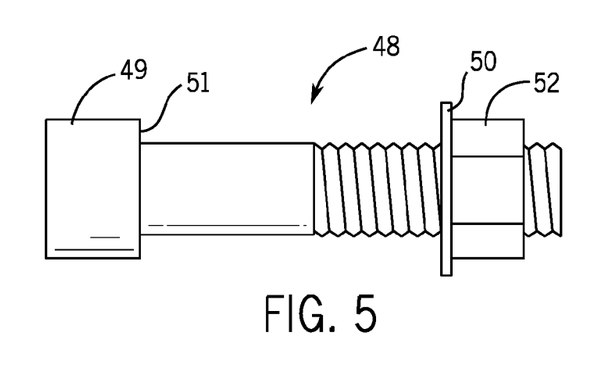
FIG. 5 depicts an exemplary embodiment of a pivot bolt.
Figure 12:
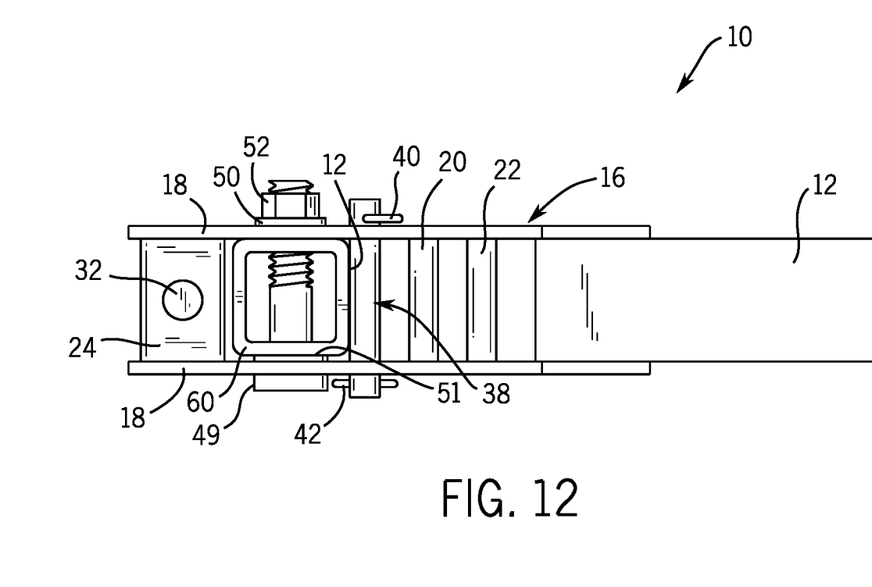
FIG. 12 is a top view of an exemplary embodiment of a folding hitch adaptor with an accessory shank in the up position.

The pivot bolt 48, which is exemplarily depicted in FIG. 5 is exemplarily used with the folding hitch 10 to pivotably secure the accessory shank to the folding hitch 10. FIG. 5 depicts an exemplary embodiment of a pivot bolt 48. The pivot bolt 48 exemplarily includes a washer 50 and a nut 52 to secure the pivot bolt 48 through the pivot holes 26a, 26b. In an embodiment, the pivot bolt 48 enables the folding hitch 10 to serve as a removable folding hitch adapter between an otherwise non-folding accessory and a vehicle receiver. In an exemplary embodiment, pivot hole 26a is larger in diameter than the pivot hole 26b (as depicted in FIG. 1). As best seen in FIG. 12, this allows the outside diameter of the head 49 of the pivot bolt 48 to at least partially pass through the pivot hole 26a and engage a side of the accessory shank 60 with an interior lip 51 of the head 49. When the pivot bolt 48 is tightened with the washer 50 and nut 52, the accessory shank is pivotably secured to the folding hitch 10, but also secured against only one of the side plates 18, the side plate 18 that comprises the pivot hole 26b. The accessory shank is pinched between the head 49 of the pivot bolt 48 and the side plate 18, which reduces play (sometimes referred to as "wobble" or "tilt") in the accessory shank between the side plates 18 of the folding hitch 10 when in use.

In other embodiments, the accessory (or the accessory shank) may be pivotably secured to the folding hitch 10 in a more permanent manner. Exemplarily, a unitary pivot rod (not depicted) can replace the pivot holes 26a, 26b and pivot bolt. The unitary pivot rod exemplarily extends through the accessory shank and rod is welded between the support plates 18 to secure the accessory shank in a pivotable manner relative to the folding hitch 10. The folding hitch 10 further includes at least one set of retention holes 28 through each of the side plates 18. As depicted, the folding hitch 10 includes at least two pairs of retention holes 28a, 28b through each of the side plates 18. As will be described in further detail herein, a retaining rod (depicted in FIG. 4) extends between aligned retention holes 28 to secure the accessory shank in at least one position, as exemplarily depicted in FIGS. 8 and 9 and described in greater detail herein.

Figure 3:
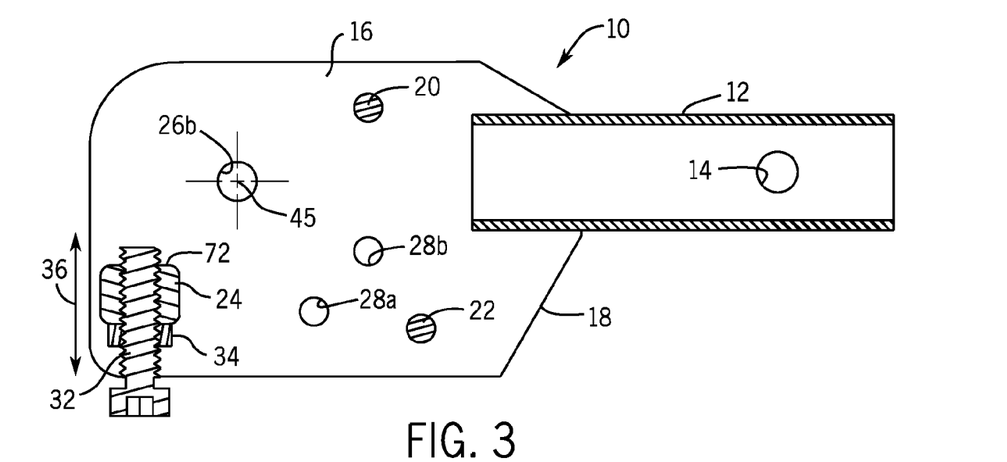
FIG. 3 is a cut away view of an exemplary embodiment of the folding hitch taken along line 3-3 of FIG. 2.

Referring to FIGS. 2 and 3, FIG. 3 being a sectional view taken along line 3-3 of FIG. 2, the support ledge 24 further includes a threaded bore 30 and a set screw 32 received therethrough. In an exemplary embodiment, set screw 32 further includes a nut 34 which can operate to tighten the set screw 32 into a desired position once positioned. The set screw 32 is linearly movable in a threaded manner exemplarily in a direction along line 36, as will be described in further detail herein. In embodiments, the accessory shank engages the support ledge 24 when in a down position and the set screw 32 is used to tighten and make fine adjustments to the engagement between the support ledge 24 and the accessory shank.

Figure 4:
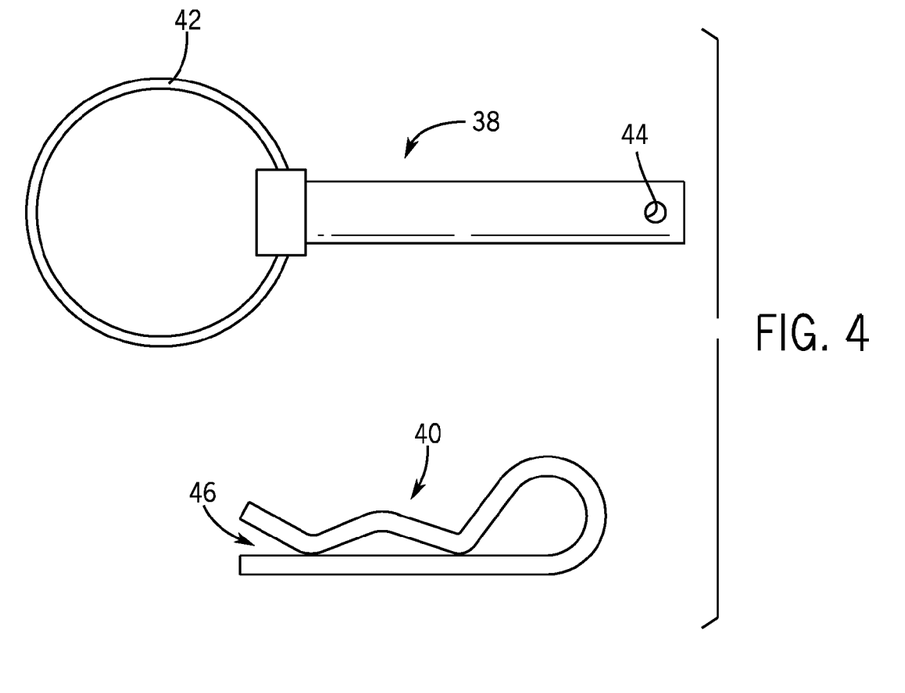
FIG. 4 exemplarily depicts a retaining rod and a retaining pin.

FIG. 4 depicts an exemplary embodiment of a retaining rod 38 and a retaining pin 40. The retaining rod 38 is exemplarily cylindrical in shape, and in one embodiment, includes a retaining rod ring 42 to facilitate handling and use by a user. The retaining rod 38 is exemplarily received through a pair of adjacent retention holes 28 in the side plates 18 to secure an accessory shank (not depicted) in at least one position. The retaining rod 38 further exemplarily includes a retaining pin hole 44. The retaining pin hole 44 is configured to receive an end 46 of the retaining pin 40 to lock the retaining rod into position through a pair of retention holes 28. In an exemplary embodiment, the retaining pin hole 44 is oriented in a manner generally perpendicular to a diameter dimension of the retaining rod ring 42. This further facilitates gripping and use of the retaining rod ring 42 and insertion of the retaining pin 40 into the retaining pin hole 44 secured by the same user.

Figure 6:
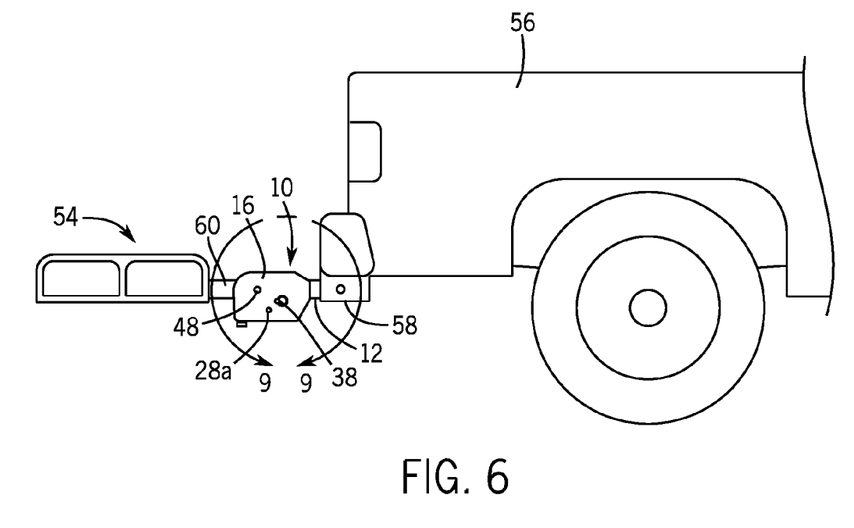
FIG. 6 depicts an exemplary embodiment of an accessory in use with an exemplary embodiment of a folding hitch configured in a down position.
Figure 7:
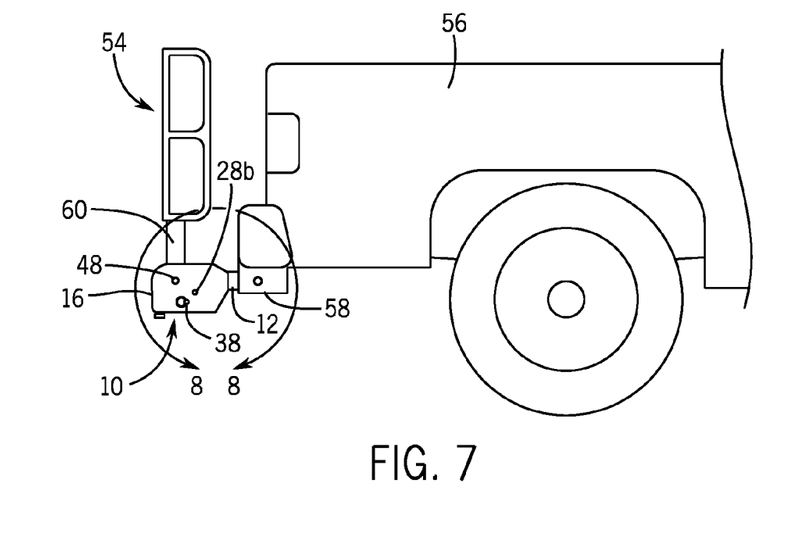
FIG. 7 depicts an exemplary embodiment of an accessory in use with an exemplary embodiment of a folding hitch configured in an up position.

FIGS. 6 and 7 depict exemplary embodiments of a folding hitch 10 in use with an automotive accessory 54 which is exemplarily depicted as a cargo basket. Although the automotive accessory is exemplarily depicted as a cargo basket, it will be recognized that any of a variety of storage and/or transportation accessories may exemplarily be used within embodiments as disclosed herein, these automotive accessories 54 may include, but are not limited to cargo platforms, cargo boxes, carriers and lifts for wheelchairs, bicycles, dirt bikes, motorcycles, scooters, ATV's, or other carriers, steps, platforms, hitches, outboard motor carriers, and other cargo and/or transportation accessories, which may exemplarily be secured to a vehicle 56 at a receiver 58.

The automotive accessory 54 further includes an accessory shank 60 which is pivotally secured to the folding hitch 10 as will be described in further detail herein. It will be recognized that in some embodiments, the accessory shank 60 may be removably pivotally secured to the folding hitch 10, exemplarily by a removable pivot bolt 48. In other embodiments, the folding hitch 10 may be more permanently pivotally secured to the accessory shank 60 of an automotive accessory 54. Such an embodiment may exemplarily be implemented by securing a pivot rod through the accessory shank 60 between the side plates 18, for example by welding.

Figure 8:
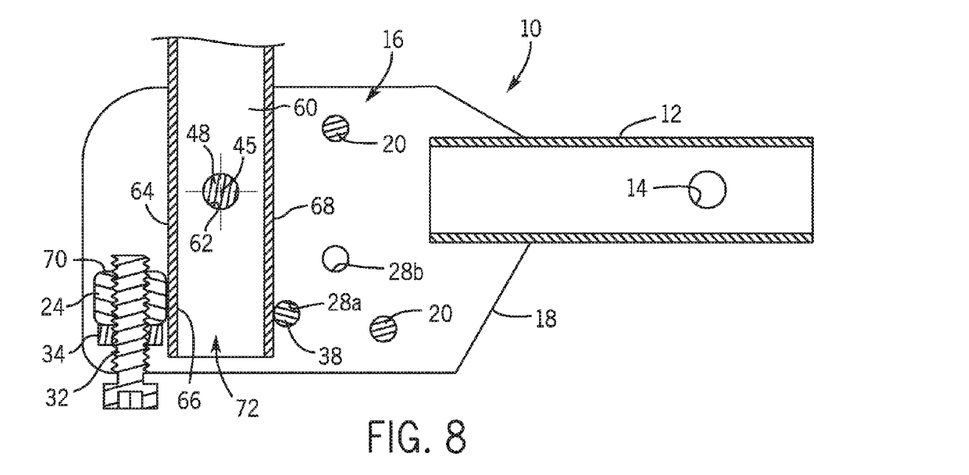
FIG. 8 is a sectional side view of an exemplary embodiment of a folding hitch of FIG. 7 with an accessory shank in an up position.
Figure 9:
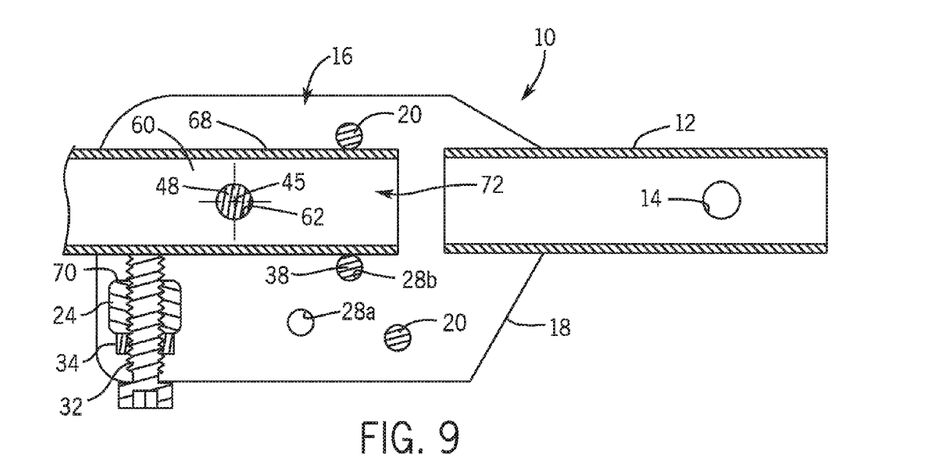
FIG. 9 is a sectional side view of an exemplary embodiment of a folding hitch of FIG. 6 with an accessory shank in a down position.
Figure 10:
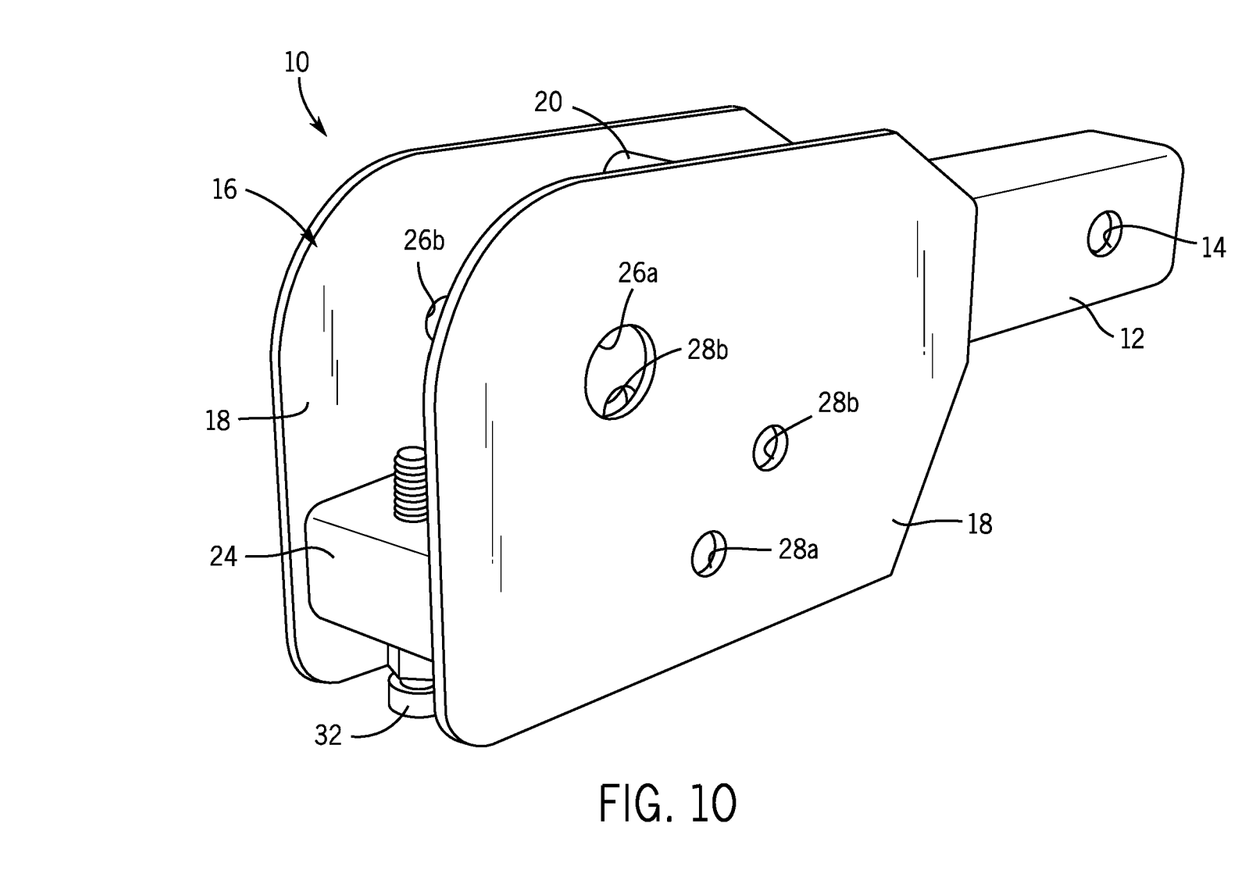
FIG. 10 is a front perspective view of an exemplary embodiment of a folding hitch adaptor.
Figure 11:
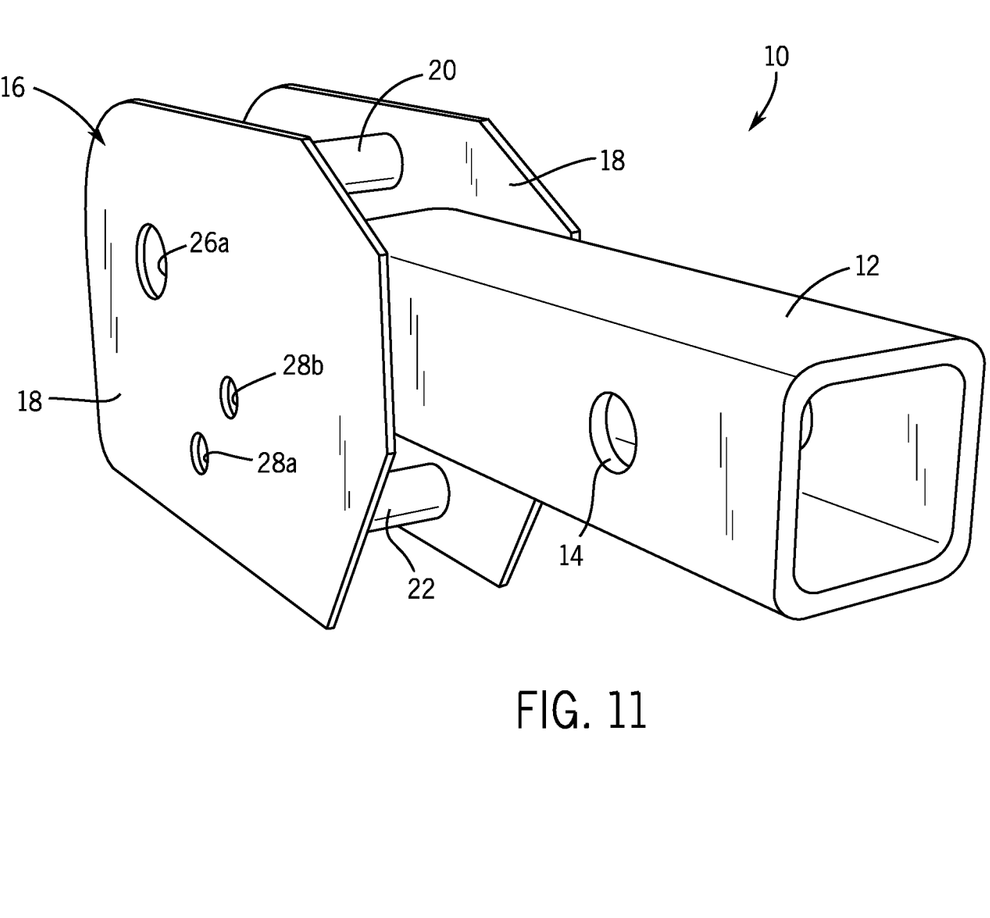
FIG. 11 is a back perspective view of an exemplary embodiment of a folding hitch adaptor.

FIG. 6 depicts an exemplary embodiment of the folding hitch 10 and automotive accessory 54 in a down or horizontal position while FIG. 7 depicts the folding hitch 10 and automotive accessory 54 in an up or vertical position. FIG. 8 is a sectional side view of the folding hitch 10 and shank 60 FIG. 7, depicting the internal structure of the folding hitch 10 when the automotive accessory 54 is in the up or vertical position. FIG. 9 is a sectional side view of the folding hitch 10 and shank 60 of FIG. 6 and depicts the inside of the folding hitch 10 when the automotive accessory 54 is in the down or horizontal position.

As can be best seen in reference to FIGS. 8 and 9, and with contextual reference to FIGS. 6 and 7, when the automotive accessory 54 is in the up or vertical position (FIGS. 7 and 8), the accessory shank 60 is in a vertical or perpendicular orientation to the hitch shank 12. The accessory shank 60 is rotatable about the pivot bolt 48 which extends through a through-hole 62 of the accessory shank 60. A first side 64 of the accessory shank 60 engages a side 66 of the support ledge 24. This engagement prevents further rotation of the accessory shank 60 towards the up or vertical position. In this manner, the support ledge 24, and more specifically the side 66 of the support ledge 24 defines the up or vertical position of the accessory shank 60. The up position of the shank 10 may be vertical or may be an angle short of or past vertical as well. In an embodiment, an up position slightly past vertical may help to retain the accessory shank 60 (and the accessory 54) in the up position before it is locked into place as described herein.

A retaining rod 38 locks the shank 60 into the up position. This is further depicted in the top view of FIG. 12. The retaining rod 38 is inserted through retention holes 28a in the folding hitch 10. The retaining rod 38, when extending through the retention holes 28a, engages a second side 68 of the accessory shank 60. The second side 68 is opposite the first side 64. Engagement of the second side 68 with the retaining rod 38 prevents rotation of the accessory shank 60 about the pivot bolt 48 to the down position. This secures the automotive accessory 54 attached to the accessory shank 60 in the up or vertical position. The retaining holes 28a are located such as to make the engagement between the support ledge surface 66, the shank 60 and the retaining rod 38 secure. In an embodiment, movement of the shank 60 when locked in the up position is minimized. This reduces torque and forces on the shank during movement of the vehicle which will exacerbate any play between the shank 60 and the folding hitch adapter 10. As also depicted in FIG. 12, the head 49 of the pivot bolt 48 extends partially through the larger pivot hold 26a and the lip 51 of the head 49 engages the exterior of the accessory shank 60. In an embodiment, a portion of the head 49 of the pivot bolt 48 may visibly extend past the side wall 18, while in another embodiment, the head 49 may extend through the side wall 18 only enough such as to securely engage the vehicle shank with the lip 51. Tightening of the nut 52 pinches the accessory shank 60 against the side wall 18. This eliminates wobble of the accessory shank 60 between the side walls 18, but also enables pivoting movement of the accessory shank 60 as described herein.

As will be described in further detail herein, the inventors have discovered that engagement of the exterior of the shank (as provided respectively by support ledge surface 66 and retaining rod 38) at a position at an end 72 of the accessory shank 60 opposite the accessory 54 from the pivot point, provides a more secure engagement than previous solutions wherein a retaining rod engages through another portion of an accessory shank (not depicted).

When the user wishes to use the automotive accessory in the down or horizontal position (FIGS. 6 and 9), the user exemplarily temporarily removes the retaining rod 38 from the retention holes 28a and rotates the automotive accessory 54 and accessory shank 60 about pivot point 45 exemplarily defined by the pivot bolt 48 to move the automotive accessory 54 and the accessory shank 60 into the down or horizontal position. This down or horizontal position may exemplarily be defined in part by engagement of the second side 68 of the accessory shank 60 with a support bar 20. In an additional exemplary embodiment, the support bar 20 is positioned such that engagement between the support bar 20 and the second side 68 of the shank 60 aligns the accessory shank 60 parallel and/or coaxial with the hitch shank 12. This engagement between the support bar 20 and the second side 68 of the shank 60 stops further rotation of the accessory shank 60 about the pivot bolt 48 and defines the down position. In an exemplary embodiment, the accessory shank 60 (and accessory) may be pivotable about the pivot bolt 48 through a range of about 90 degrees; however, other embodiments may have more or less rotation range, including, but not limited to, 100 degrees. Such rotation range may in part be defined by structural components of the folding hitch, including, but not limited to a position of the support ledge 24 and the set screw 32, as will be described in further detail herein.

The user may further insert the retaining rod 38 to retention holes 28b of the folding hitch 10 in a position such that the retaining rod 38 engages the first side 64 of the accessory shank 60. This locks the shank 60 and accessory 54 in the down or horizontal position and prevents rotation of the accessory shank 60 about pivot bolt 48 out of the down position. In an embodiment, the retention holes 28b are located in the side plates 18 in a position dimensioned to securely engage the first side 64 of the shank 60 while also engaging the support bar 20 with the second side 68 of the accessory shank and to minimize any play within which the shank may rotate about the pivot bolt 48 when the retaining rod 38 extends through the retention holes 28b. As described above, when the automotive accessory 54 is used to carry a load, movement such as the ability of the shank 60 to rotate about the pivot bolt 48 creates an additional force movement against the hitch receiver 58. This is only increased when the accessory 54 extends outwards or a heavy load is placed in or on the accessory 54. Furthermore, alignment between the accessory shank 60 and the hitch shank 12 when the accessory shank 60 is in the down position facilitates transfer of the load of accessory 54 (and anything in or on the accessory 54) to the receiver 58 on the vehicle.

As mentioned above, when a load is placed in the automotive accessory 54 in the down or horizontal position, this creates a significant force moment at a distance away from the pivot bolt 48. This can cause wobbling and tilting of the automotive accessory relative to the folding hitch 10 about the pivot bolt 48. While in embodiments, the top 70 of the support ledge 24 is located and dimensioned to engage the first surface 64 of the shank 60 when the shank 60 is in the down position. In still further embodiments, set screw 32 extends past the top 70 of the support ledge 24 to engage the shank 60. Set screw 32 may be adjusted through the threaded bore 30 in the support ledge 24 in order to engage the first surface 64 of the shank to place a counter force on accessory shank 60 to rotate the shank 60 into engagement with the retaining rod 38 in such a manner as to eliminate rocking and wobble in the automotive accessory 54. While not depicted, other embodiments may include multiple set screws or other structures that facilitate engagement of the set screw 32 and the accessory shank 60.

In a still further aspect, the retention holes 28a, 28b are located such that the retaining rod 38 engages the accessory shank 60 at an end 72 of the shank 60. Location of the retention holes 28a, 28b such that the retaining rod engages the shank 60 in this manner minimizes the rotation of the shank 60 about the pivot bolt 48 within the tolerance of the placement of the retention holes 28a, 28b. For example, using the equation Arc Length=$2\pi r\sigma/360$, a difference of 1/10 inch in the placement of the retention holes 28a, 28b and resulting position of the retaining rod 38 against the shank 60 allows for 5.7° of rotational movement of located one inch from the center of the pivot bolt 48, while only allows for 1.9° of rotational movement if located three inches from the center of the pivot bolt 48.

Embodiments of the folding hitch adapter disclosed herein improve over other solutions in the field by providing selective rotative movement of an accessory while securing that accessory with improved resistance to wobble during use. Embodiments secure the accessory shank in the selected position by engaging both the first side and the second side of the exterior of the shank at a position on a opposite side of the pivot point/pivot bolt from the accessory. In an exemplary embodiment, this is achieved with the shank in the up position between a side of the support ledge and the retaining rod. This may be achieved with the shank in the down position between the support bar and the retaining rod. In the down position, which may be the use or load bearing position a set screw extending upwards for the support ledge engages the accessory shank on a side of the accessory shank opposite the support bar and the retaining rod with respect to the pivot point/pivot bolt. This screw places a biasing force against the shank to further reduce or eliminate wobble during use. The inventors have found that this arrangement produces improved elimination of wobble in an adaptor compared to prior solutions in which members extend through the shank to lock the shank and/or rely upon engagement on the accessory side of the shank to the pivot point, or require disconnection of the shank from the adapter to move the accessory between the up and down positions.

The embodiments disclosed herein are for the sake of explanation and are not intended to be limiting on the scope of the disclosure as would be recognized by a person of ordinary skill in the art, having read such disclosure. While the embodiments have referred to the retention rod as using one rod that is selectively engaged between the retention holes, an equivalent embodiment could use two retention rods, each retention rod selectively engageable with a set of the retention holes. Additionally, while the embodiment has been described with the downward position being the load bearing or "use" position, in embodiments, operation may be reversed and the up position being the load bearing position. In such embodiments, other features as described herein may be reversed to accommodate this.

A further advantage of embodiments of the folding hitch adaptor disclosed herein is provision of the benefits identified above in a system that universally receivers accessory shanks. Accessory shanks include at least a single pair of through holes, which would otherwise be received in the hitch receiver on the vehicle. Folding adaptors that use a retaining pin that extends through the shank require that the accessory shank originally include a second pair of through holes, which must be in alignment with the retaining pin holes of the folding adaptor. Otherwise, if the shank does not include these holes, or the holes are located elsewhere, the user must drill out additional holes. By supporting the shank in a manner that resists wobble by engaging the exterior of the shank, embodiments of the disclosed folding hitch adaptor are compatible for use with a wide variety of aftermarket hitch-mounted vehicle accessories.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

The invention claimed is:

1. A folding hitch assembly, comprising:
   two opposed side plates;
   a vehicle shank secured partially between the two opposed side plates and extending outward therefrom;
   a support ledge secured between the two opposed side plates;

pivot holes respectively located in each of the opposed side plates, the pivot holes located through the side plates intermediate to the support ledge and the vehicle shank;

a support bar secured between the two opposed side plates at a position intermediate the pivot holes and the vehicle shank;

a pair of first retention holes through the opposed side plates and located below the pivot holes and towards the vehicle shank from the pivot holes; and a pair of second retention holes through the opposed side plates and located below the pivot holes and towards the vehicle shank from the pivot holes, wherein the pivot holes are laterally centered between a front of the first retention holes and a rear side of the support ledge.

2. The folding hitch assembly of claim 1, wherein the pivot holes are vertically centered with the vehicle shank and between the bottom of the support bar and a top of the second retention holes.

3. The folding hitch assembly of claim 1, wherein a bottom of the support bar is laterally aligned with a top of the vehicle shank.

4. The folding hitch assembly of claim 1, wherein the support ledge further comprises:
a threaded aperture defined through the support ledge;
a screw threadingly movable in a vertical direction through the threaded aperture.

5. The folding hitch assembly of claim 1, wherein a top of the support ledge is laterally aligned with a bottom of the vehicle shank.

6. A folding hitch assembly, comprising:
two opposed side plates;
a vehicle shank secured partially between the two opposed side plates and extending outward therefrom;
a support ledge secured between the two opposed side plates;
pivot holes respectively located in each of the opposed side plates, the pivot holes located through the side plates intermediate to the support ledge and the vehicle shank;
a support bar secured between the two opposed side plates at a position intermediate the pivot holes and the vehicle shank; and
a pair of first retention holes through the opposed side plates and located below the pivot holes and towards the vehicle shank from the pivot holes;
wherein the pivot holes are aligned with a central axis of the vehicle shank.

7. A folding hitch system, the folding hitch system comprising:
an accessory shank comprising a first side and an opposed second side;
a hitch body comprising:
two opposed side plates, the accessory shank pivotably secured between the two opposed side plates at a pivot point;
a support ledge secured between the two opposed side plates at a position forward of the pivot point;
a support bar secured between the two opposed side plates at a position rearward of the pivot point;
a pair of first retention holes through the opposed side plates and located below the pivot point and rearward of the support ledge; and
a pair of second retention holes through the opposed side plates and located below the pivot point and rearward the pivot point;

a vehicle shank secured partially between the two opposed side plates and extending rearward therefrom;
a retention rod selectively securable between the pair of first retention holes and the pair of second retention holes;
wherein the accessory shank is pivotable between a first position and a second position and when the accessory shank is in the first position, the retention rod secured between the first retention holes and engages the second side of the accessory shank to secure the accessory shank in the first position, and when the accessory shank is in the second position, the retention rod secured between the second retention holes and engages the first side of the accessory shank to secure the accessory shank in the second position.

8. The folding hitch system of claim 7, wherein in the first position, the first side of the accessory shank engages a side of the support ledge, and wherein in the second position, the second side of the accessory shank engages the support bar, and the first side of the accessory shank engages a top of the support ledge.

9. The folding hitch system of claim 8, wherein:
the accessory shank comprises a first end that located between the two opposed side plates and a second end that extends outward past the two opposed side plates;
when the accessory shank is in the first position, the first side of the accessory shank engages the side of the support ledge with a portion of the first side of the accessory shank between the pivot point and the second end of the accessory shank;
when the accessory shank is in the second position, the first side of the accessory shank engages the top of the support ledge with a portion of the first side of the accessory shank between the pivot point and the first end of the accessory shank; and
when the accessory shank is in the second position, the second side of the accessory shank engages the support bar with a portion of the accessory shank between the pivot point and the second end of the accessory shank.

10. The folding hitch system of claim 7, wherein when the accessory shank is in the second position, the accessory shank is coaxially aligned with the vehicle shank.

11. The folding hitch system of claim 7, further comprising a pivot bar secured at the pivot point between the two opposed side plates and the accessory shank pivots about the pivot bar.

12. The folding hitch system of claim 11, further comprising: first and second pivot holes respectively located through the two opposed side plates at the pivot point, the first pivot hole being larger in diameter than the second pivot hole; wherein the pivot bar is a bolt comprising a head with a lip, and the bolt is secured through the accessory shank and the pivot holes; and wherein the head of the bolt extends through the first pivot hole to engage the accessory shank with the lip of the head.

13. The folding hitch system of claim 7, wherein the support ledge further comprises:
a threaded aperture defined through the support ledge; and
a screw threadingly movable in a vertical direction through the threaded aperture.

14. A method of securing an accessory to a vehicle, the method comprising:
pivotably securing an accessory shank of a vehicle accessory to a folding hitch adaptor at a pivot point, the folding hitch adaptor comprising:
two opposed side plates;

a vehicle shank secured partially between the two opposed side plates and extending outward therefrom;

a support ledge secured between the two opposed side plates;

a support bar secured between the two opposed side plates at a position intermediate the pivot point and the vehicle shank;

a pair of first retention holes through the opposed side plates and located below the pivot point and rearward the support ledge; and a pair of second retention holes through the opposed side plates and located below the pivot point and towards the vehicle shank fro the pivot point;

securing the vehicle shank to a hitch receiver of a vehicle;

pivoting the accessory shank about the pivot point to a first position;

engaging the support ledge with a first side of the accessory shank;

locking the accessory shank in the first position by securing a retention rod through the pair of first retention holes in engagement with a second side of the accessory shank;

removing the retention rod from the pair of first retention holes;

pivoting the accessory shank about the pivot point to a second position;

engaging the support ledge with the first side of the accessory shank;

engaging the support bar with the second side of the accessory shank; and locking the accessory shank in the second position by securing the retention rod through the pair of second retention holes in engagement with the first side of the accessory shank.

15. The method of claim 14, wherein the support ledge comprises a threaded aperture defined through the support ledge and a screw threadingly movable in a vertical direction through the threaded aperture, and the method further comprises:

adjusting the screw to tighten the accessory in the second position.

16. The method of claim 14, wherein the first position comprises a vertical orientation of the accessory shank and the second position comprise a horizontal orientation of the accessory shank.

17. The method of claim 14 wherein in the second position, the accessory shank is coaxially aligned with the vehicle shank.

18. The method of claim 14, wherein:

the accessory shank comprises a first end that located between the two opposed side plates and a second end that extends outward past the two opposed side plates;

when the accessory shank is in the first position, the first side of the accessory shank engages the side of the support ledge with a portion of the first side of the accessory shank between the pivot point and the second end of the accessory shank;

when the accessory shank is in the second position, the first side of the accessory shank engages the top of the support ledge with a portion of the first side of the accessory shank between the pivot point and the first end of the accessory shank; and when the accessory shank is in the second position, the second side of the accessory shank engages the support bar with a portion of the accessory shank between the pivot point and the second end of the accessory shank.

* * * * *

UNITED STATES PATENT AND TRADEMARK OFFICE
CERTIFICATE OF CORRECTION

PATENT NO. : 9,663,039 B2
APPLICATION NO. : 14/993758
DATED : May 30, 2017
INVENTOR(S) : Lawrence Marmon et al.

Page 1 of 1

It is certified that error appears in the above-identified patent and that said Letters Patent is hereby corrected as shown below:

In the Claims

In Claim 14, at Column 11, Line 13: the word 'fro' should instead read --from--.

Signed and Sealed this
First Day of August, 2017

Joseph Matal
*Performing the Functions and Duties of the*
*Under Secretary of Commerce for Intellectual Property and*
*Director of the United States Patent and Trademark Office*